June 15, 1954

H. H. ZODTNER ET AL 2,681,041

FOUNTAIN PEN

Filed June 8, 1946

INVENTOR.
Harlan H. Zodtner
BY James A. Mustard

Fidler & Crouse
ATTORNEYS.

June 15, 1954  H. H. ZODTNER ET AL  2,681,041
FOUNTAIN PEN Filed June 8, 1946  6 Sheets-Sheet 2

INVENTOR.
Harlan H. Zodtner
BY James A. Mustard

June 15, 1954  H. H. ZODTNER ET AL  2,681,041
FOUNTAIN PEN
Filed June 8, 1946  6 Sheets-Sheet 3

INVENTOR.
Harlan H. Zodtner
James A. Mustard
BY
ATTORNEYS.

Patented June 15, 1954

2,681,041

UNITED STATES PATENT OFFICE 2,681,041

FOUNTAIN PEN

Harlan H. Zodtner and James A. Mustard, Janesville, Wis., assignors to The Parker Pen Company, Janesville, Wis., a corporation of Wisconsin Application June 8, 1946, Serial No. 675,407

17 Claims. (Cl. 120—50)

This invention relates to fountain pens and it has to do with new and novel means for filling the pen and for feeding the ink to a writing surface.

One of the objects of this invention is to provide an improved fountain pen which is simple in construction, inexpensive to manufacture, and which is adapted to perform its reservoir-filling and its writing functions with a high degree of efficiency.

Another object is to provide new and novel means for filling a fountain pen.

Another object is to provide new and novel means for feeding ink from the ink reservoir of a pen to a writing surface.

A further object is to provide a fountain pen having an ink reservoir of substantial capacity adapted to be filled solely by capillary action without the aid of mechanically manipulated filling devices.

A further object is to provide a fountain pen in which the possibility of leakage under varying temperature conditions or at high altitudes is eliminated.

Another object of the invention is the provision of a fountain pen having filling means devoid of moving parts, or parts which are subject to deterioration, and which filling means is not subject to wear or loss of operative adjustment, but is capable of operating almost indefinitely without replacement or adjustment of parts.

Another object of the invention is to provide a fountain pen in which the amount of ink which can be drawn into the reservoir by the filling operation is controlled automatically, insuring that the pen will be filled to a predetermined capacity without overfilling, and which requires a minimum of attention on the part of the user during filling.

Still another object of the invention is the provision of a fountain pen in which the ink is drawn into the pen, retained in the reservoir and fed to the writing element solely by capillary action and which does not depend upon the maintenance of a sub-atmospheric pressure within the pen for retaining the ink or increase of such pressure for permitting the ink to feed to the writing element.

Another object of the invention is the provision of a capillary filling fountain pen having a filler element with capillary passages so formed that a relatively high percentage of the ink which is drawn into the pen during filling can be written-out, whereby, the pen can be filled, writtenout, refilled and written out indefinitely without substantial decrease in the effective ink capacity of the pen.

Other and more specific objects of the invention are to provide a capillary filler element having capillary cells and passages defined by rigid, fixed wall members whereby the size, shape and locations of the capillary cells and passages can be predetermined; to provide a filler element which can be readily manufactured and assembled in a fountain pen body; to provide a filler element which has a capillary feed extending substantially directly from the ink reservoir to the pen nib slit; to provide a feed which will insure that substantially all of the ink is withdrawn from the ink reservoir in writing; to provide a filler element having air equalizer means incorporated therein for insuring the maintenance of equal air pressures throughout the pen; to provide a filler element which supports a nib and feed bar within the pen body in proper feeding relation to the filler element; to provide a filler element which will last almost indefinitely and will not deteriorate; to provide a filler element which is self-cleaning and which will not clog; to provide a filler element which can be used with a pen body of substantially conventional overall size and shape and with a pen nib of known construction.

Other objects and advantages of the invention will appear from the following description and from the appended drawings, in which.

Figure 1:
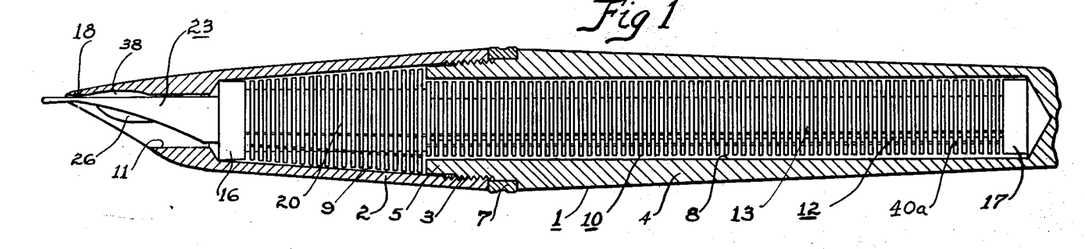
Figure 1 is an enlarged fragmentary view of a vertical, longitudinal section through one illustrative embodiment of the invention, certain of the internal members being shown in elevation.

Referring now particularly to Figures 1 to 11, and especially to Fig. 1, the fountain pen comprises an elongated body 1 including a front section 2 having secured thereto, as by screw threads 3, a rear section 4 formed with a reduced inner end 5 fitted into the front section 2 and carrying a clutch ring 7. The body sections 2 and 4 are formed of a suitable material, such as hard rubber or a plastic which can be formed as by molding or machining or both, and which is not deteriorated by conventional inks.

The fountain pen can be made as a pocket pen having the usual cap (not shown), or as a desk pen and having the usual elongated tail piece (not shown), or as a convertible pen which can be used either as a pocket pen or a desk pen.

The body sections 2 and 4 are formed with bores 8 and 9, respectively, which together provide a chamber 10 defining an ink reservoir space extending throughout a substantial portion of the length of the pen body 1 and adapted to contain sufficient ink for a relatively large amount of writing.

The reservoir space formed by the chamber 10 contains means therein for drawing in ink by capillary action when the end of the pen is inserted in a supply of ink. To this end an elongated capillary filler-and-reservoir element 12 is disposed in the chamber 10 and extends substantially throughout the length and breadth thereof. The filler element is formed from a suitably rigid material which is wettable by the conventional inks and which will not deteriorate over a long period of use. We have found that hard rubber, plastics such as "Pyralin" (cellulose nitrate plastic), "Lucite" (methyl methacrylate resin), nylon, or polystyrene and metals, such as silver and gold are highly satisfactory, although other materials having the above properties may also be used.

The capillary filler element 12 takes the form of a capillary cell structure comprising a series of longitudinally spaced wall elements defining spaced capillary cells. In the form of the invention illustrated in Figs. 1 to 11, the filler element 12 is formed with a central, longitudinal core 13 and a series of circumferentially extending, axially spaced fins 14, which preferably are integral with the core 13, and extend to closely adjacent the side walls of the chamber 10. The fins 14 may be formed in any suitable manner which will provide wall members of the desired spacing as, for example, by slotting a generally cylindrical body with a gang saw. The spaces between adjacent fins 14 are of capillary width, as will be explained in more detail hereinafter, thus constituting a series of capillary chambers or ink storage cells 15 of generally annular form.

The fins 14 are made as thin as practicable, consistent with mechanical strength and rigidity, thus providing the maximum number of capillary cells for any predetermined length of cell structure and cell widths. The core 13 is made as small as practicable, consistent with mechanical strength and rigidity, to provide capillary cells of maximum depth, and consequently maximum capacity, for any predetermined diameter of chamber and cell widths. End fins or heads 16 and 17 preferably are relatively thicker than the intermediate fins 14, to provide abutment means for firmly seating the filler element 12 in the chamber 10.

Figure 27:
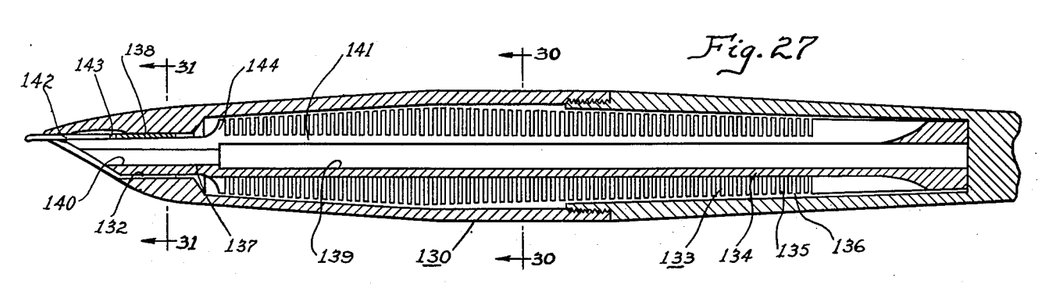
Figure 27 is an enlarged fragmentary, vertical, longitudinal sectional view through still a further embodiment of the invention.
Figure 28:
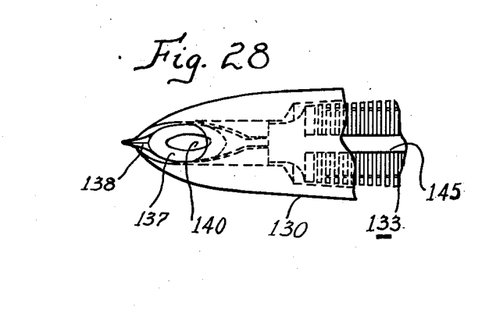
Figure 28 is a fragmentary bottom plan view of the nib end of the pen of Figure 27.
Figure 29:
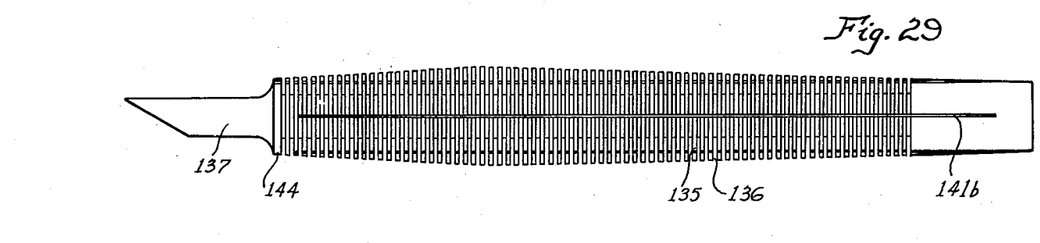
Figure 29 is a side elevational view of the unitary cell element and feed bar of the pen of Figure 27.
Figure 31:
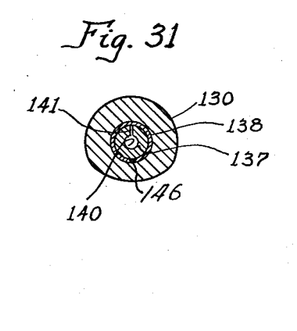
Figure 31 is a transverse sectional view taken along line 31—31 of Figure 27.
Figure 32:
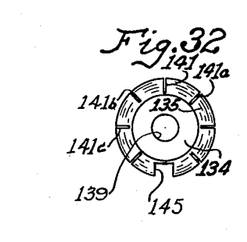
Figure 32 is a rear end elevational view of the structure shown in Figure 29.

The bore 9 preferably is tapered outwardly from front to rear to correspond to the taper of the external wall, and the fins 14 in that portion of the filler element (indicated by $a$, $b$, $c$ and $d$ in Fig. 4) increase in diameter from the front toward the rear of the pen in a corresponding manner. Thus, the annular cells 15 in the forward portion of the reservoir have outer diameters, which are the maximum diameters practicable for the corresponding external diameters of the pen body. For convenience in manufacture and assembly the bore 8 in the rear section preferably is made uniform in diameter throughout its length and the fins in the rearward portion of the cell structure (indicated by $e$ in Fig. 4) are correspondingly of uniform diameter. However, it will be understood that the bore 8 in the rear section also may taper in diameter correspondingly with the external taper of the body and the fins in that portion of the cell structure (indicated by $e$ in Fig. 4) may vary in diameter accordingly, as in the embodiment of the invention illustrated in Fig. 27 and described more fully hereafter.

The core 13 is provided with an enlarged end or head 20 formed with a counterbore 21 and bore 22 which together comprise a nib and feed bar socket. A pen nib 23 having a slit 33 is frictionally received and firmly seated in the bore 21 in such position that only a small portion of the slitted end of the nib projects through a bore 11 in the front section 2. The pen nib 23 may be of any suitable form, but preferably is of the type described in Baker United States Letters Patent No. 2,223,541.

The top wall of the bore 11 (Fig. 2) is relieved or recessed slightly adjacent its front end to provide a capillary feed space 38, preferably triangular in shape, above the nib 23, which space extends from rearwardly of the nib pierce 35 to close to the writing tip of the nib 23.

A feed bar 24 is formed with a cylindrical body portion 25 which projects rearwardly of the nib 23 and frictionally and firmly seats in the bore 22 in the head 20, and with a reduced semi-cylindrical portion 26 which extends along the underside of the nib 23. The feed bar 24 is of slightly less diameter than the nib 23, providing therewith a space 37 which is annular at its rear end and partially annular at its front end. In order to augment the feeding action of the capillary feed space 37, a plurality of feed slots 36 may be provided in the upper wall of the feed bar 24, which slots extend longitudinally of the feed bar 24 from the rear end thereof to forwardly of the nib pierce 35, one of the slots 36 preferably being positioned to register with the nib slit 33 and pierce 35.

A capillary ink feed passage or duct 40 (Fig. 7) extends longitudinally throughout the capillary filler element 12 and intersects each of the cells 15 to provide means for feeding ink to the cells during filling and for feeding ink from the cells toward the nib during writing. The feed passage 40 is formed by a slot cut through the fins 14, as at 41, and cut into the core 13, as at 42. The feed passage 40 preferably is in alignment with the nib slit 33, and at its front end is cut through the core into the nib and feed bar socket to provide a slot 43 (Figs. 2 and 9) communicating with the space 37 between the nib 23 and feed bar 24.

In order to supplement the filling and feeding action of the feed passage 40, additional passages 40a (Fig. 9) may be provided by forming longitudinal slots in the filler element 12 generally similar to the feed passages 40. Preferably at least one of such additional feed passages 40a is provided in the lower portion of the filler element 12 and any additional feed passages 40a are spaced around the circumference of the filler element 12. Each additional feed passage 40a is cut through the core 13 at its forward end to communicate through slots 43a with the nib and feed bar socket in a manner similar to the feed passage 40.

A pressure equalizer or vent is provided which normally maintains the air in all portions of the pen at atmospheric pressure. The pressure equalizer includes a passage extending longitudinally of the filler element and intersecting each of the cells 15 and vented to the atmosphere at the end of the pen. In the embodiment illustrated in Fig. 1 the air passage 45 (Fig. 7) is formed by a slot 46 cut in the lower portion of the filler element and extending throughout the length thereof. At its forward end the air passage is formed by a space 39 between the lower wall of the counterbore 11, the lower wall of the feed bar 24, and a notch 32 in the nib 23. If desired, the lower wall of the bore 11 may be cut back substantially to its juncture with the chamber 10 to place the forward end of the slot 46 substantially in direct communication with the atmosphere. The air passage 45 is sufficiently larger than the adjacent capillary cells 15 so that ink will not be drawn therein from adjacent cells by capillary action. On the other hand if any ink does enter the air passage 45 from any cause, as might happen when the pen is dropped or shaken, the ink will normally be drawn back by capillary action into an empty or partially empty cell. Thus, the air passage will be maintained substantially free of ink at all times and will permit air to pass freely, but will not provide an outlet through which ink can leak from the pen.

Figure 2:
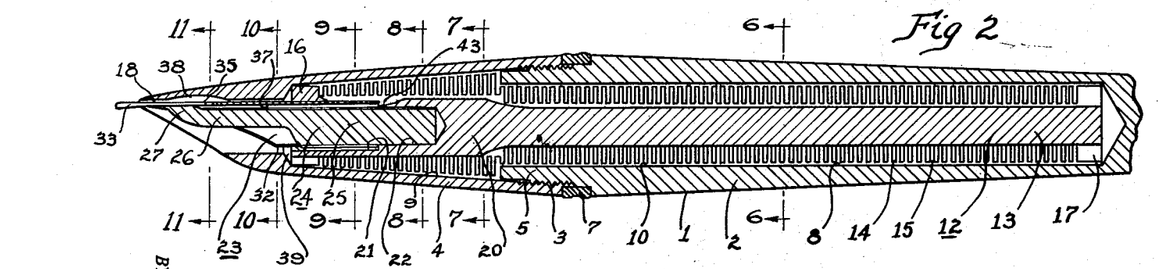
Fig. 2 is an enlarged fragmentary, vertical, longitudinal sectional view of the pen of Fig. 1.
Figure 3:
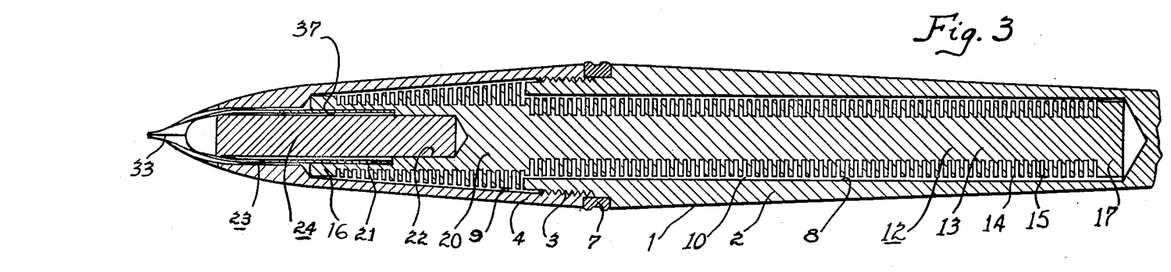
Fig. 3 is an enlarged fragmentary, horizontal, longitudinal sectional view of the pen of Fig. 1.
Figure 4:
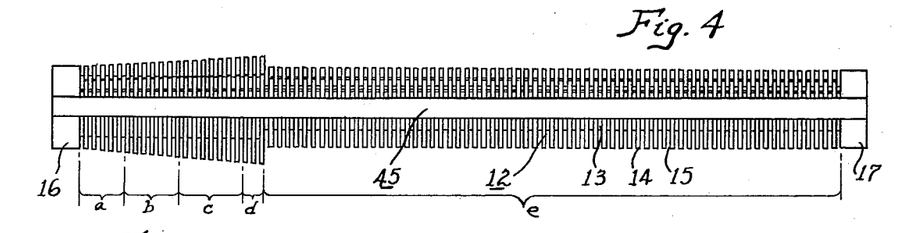
Fig. 4 is a bottom plan view of the capillary filler element of the pen of Fig. 1.
Figure 5:
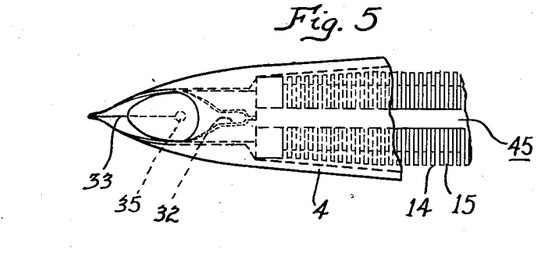
Figure 5 is a fragmentary bottom plan view of the nib end of the pen of Figure 1.
Figure 6:
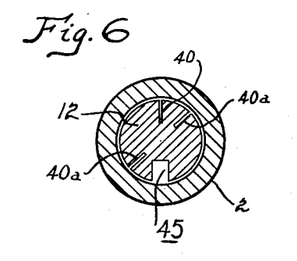
Figure 6 is a transverse sectional view taken along the line 6—6 of Figure 2.
Figure 7:
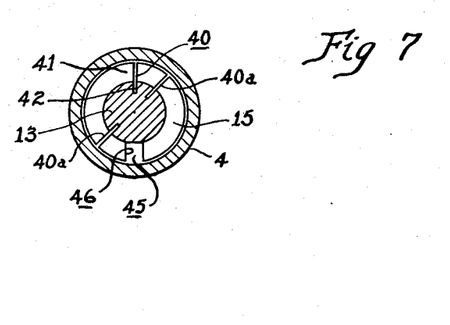
Figure 7 is a transverse sectional view taken along line 7—7 of Figure 2.
Figure 8:
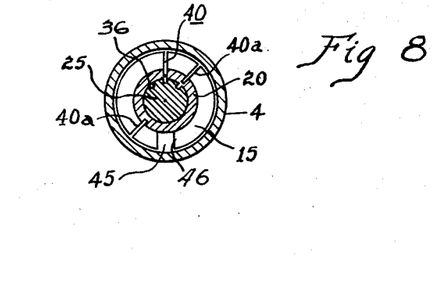
Figure 8 is a transverse sectional view taken along line 8—8 of Figure 2.
Figure 9:
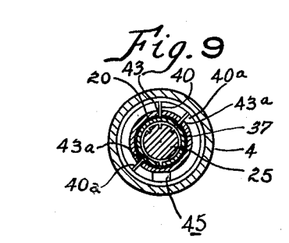
Figure 9 is a transverse sectional view taken along line 9—9 of Figure 2.
Figure 10:
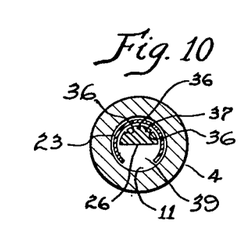
Figure 10 is a transverse sectional view taken along the line 10—10 of Figure 2.
Figure 11:
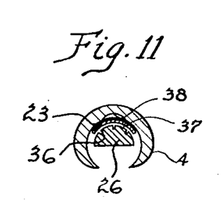
Figure 11 is a transverse sectional view taken along the line 11—11 of Figure 2.

When it is desired to fill the pen, it is merely necessary to remove the front end cap, if one is in position closing the front end of the pen, and insert the end of the pen in a supply of ink to place the capillary passages in the pen in capillary filling relation with the ink supply. Ink is drawn by capillary action into the space 37 directly from the ink supply and passes therefrom through the slots 43 and 43a to the respective feed passages 40 and 40a. Ink also is drawn into the capillary space 38, thence through the nib slit 33, and pierce 35, and thence into the space 37, and through the slots 43 and 43a into the feed passages 40 and 40a. Where the pen is inserted sufficiently in the ink supply, ink will enter the space between the feed bar 24 and the walls of the bore 21, from whence it is drawn into the space between the nib 23 and the feed bar 24 and thence through the slots 43 and 43a to the feed passages 40 and 40a. In order to provide direct communication between the feed slots 40a and the ink supply, the former may be cut through the forward end fin 16 instead of terminating rearwardly thereof as does the feed passage 40 (Fig. 2).

Ink will rise by capillary action in the feed passages 40 and 40a, the bottom and side walls of the portion 41 of the slot in the core providing continuous wall surfaces which will insure that ink is drawn by capillary action rapidly up the feed passages 40 and 40a and will enter any empty or partially full cells 15 to fill the latter. Normally the cells 15 will fill beginning at the front end of the pen but, if for any reason, a cell remains empty, or if the cells do not fill progressively, the filling of the pen will not be prevented since each cell is intersected by the feed passages and is individually in feeding relation therewith.

During filling, the ink enters empty portions of the feed passages and cells and forces the air therefrom and into the adjacent portions of the air passage 45, from whence it is vented to the atmosphere at the front end of the pen through the vent passage 39 constituted as above described. Since the air passage 45 is free and unobstructed, substantially no back pressure is developed in the vent passage if the outlet at the front end of the pen is above the level of the ink supply. However, the capillary action of the capillary system in the pen is sufficient to cause the ink which enters the pen to force out the air even if the pen is immersed in the supply of ink to such a depth that the air outlet at the front end of the pen is below the surface of the ink supply and is sealed by the ink. In this case, the air which is forced out of the pen will bubble up through the ink supply.

The vent system provides free, non-capillary air communication between all portions of the pen at all times and between the interior and the exterior of the pen when the cap is removed. Therefore, when the cap is removed, any differences between the air pressure in the pen and atmospheric pressure will be established equally on all portions of the body of ink in the pen. During use there will be no tendency for the ink to leak, or the feed of the ink to the nib be "starved" or "flooded" by reason of changes in atmospheric pressures. Likewise, when the temperature of the air in pen is changed, as when the pen is taken suddenly from cold outside air into a warm room, or vice versa, or when the pen is heated by the hand when grasped as it is in writing, the pressure on the ink is equalized with that of the atmosphere, and no leaking or blocking of the ink will occur. Since all of the cells are vented, the formation of "air locks" during filling or writing is prevented.

In order to insure that the ink will rise to the point in the filler element necessary to fill the reservoir to the desired extent, the capillarity of the feed slots must be sufficient to lift the ink to the required height above the surface of the ink supply and the capillarity of each cell must be sufficient to draw ink into that cell during filling and to retain ink therein against the action of gravity, but not so great as to prevent ink from being drawn out of the cell by capillary action of the feed passages when the pen is used in writing. Ink will rise in the pen and fill the capillary cells to a height above the surface of the ink supply as determined by the capillarity of the feed passages and capillary cells.

In order to prevent more ink being drawn into the pen when held at a low angle than can be retained by the capillary system when the pen is held vertically, the capacity and capillarity of the capillary system are so chosen that the system will be capable of retaining in any position of the pen all of the ink drawn into the pen during filling and no ink will drain out or leak.

Feeding of the ink to the nib so that ink will be available instantly at all times and so that the ink will flow smoothly and freely is accomplished by appropriate selection of the several capillarities of the various portions of the capillary system. The nib slit 33 is made with the greatest capillarity to insure that ink will be drawn therein and maintained therein at all times in order to replace ink which evaporates or which is drawn off in writing. The passages in the feed section of the pen, that is, the portions adjacent the nib and feed bar and which provide capillary passages from the ink feed passages to the pen nib slot are made with the next greatest capillarities in the system to cause ink to be drawn from the feed passages so long as any ink remains in the cells and feed passages. The feed passages in turn must be of a capillarity at least as great as, and preferably slightly greater than, that of the cells of greatest capillarity in order to draw ink from the cells and to insure that there will be no tendency for the cells to restrain the flow of ink from the cells to the feed passages. The ink, therefore, is maintained in a continuous body extending from the cells to the end of the pen nib slit, the capillarities of the several portions of the ink path being so selected as to maintain the continuity of the ink body and to insure the flow of ink to the nib during writing.

In writing, when the point of the pen nib is placed upon a writing surface, the ink which is held in the pen nib slot by capillarity is brought into contact with the writing surface and the capillarity established between the nib and the writing surface is sufficiently great to overbalance the capillarity of the capillary filler element of the pen. The pen nib slot, the longitudinal ink feed slots in the capillary filler element, and the capillary passages connecting the pen nib slot with the longitudinal ink feed slots are all of such capillarity that ink is drawn from the capillary cells by capillary action through the several ink feed passages, hereinbefore described, to the pen nib slot to replace the ink left on the writing surface as the pen moves over such surface.

Because the flow of ink to the pen nib slot in writing is thus governed by the relation of the capillarity of the filler element to the capillarity established between the pen nib and the writing surface, a very uniform flow and even supply of ink to the writing surface is produced. The internal cohesion of the ink maintains the continuity of the column of ink from the capillary cells through the capillary ink feed passages to the pen nib slot so that continuity of supply of ink to the pen nib slot is maintained as the ink is removed from the pin nib slot.

Ink is fed automatically by capillary action to the nib to replace any ink which evaporates or is drawn off during writing. When the pen is held in point-down writing position, capillary action is supplemented by gravity. Ink is drawn into the nib pierce 35 and nib slit 33 from the capillary space 37 and, where such are provided, from the grooves 36; into the capillary space 37 and the grooves 36 from the top ink feed duct 40 through the slot 43; and from the capillary space 37 through the pierce 35 and into the capillary space 38 to maintain the space filled with ink. The space 38 above the nib slit feeds ink to the nib slit 33 during writing, to supplement the feed of ink from the space 37 below the nib. In addition, the space 38 serves to insure that ink is maintained closely adjacent the slit 33 throughout a substantial portion of its length so that ink which evaporates from the nib slit 33 or is drawn off during writing is immediately replaced and the nib slit 33 is always full so that the pen is instantly ready for writing.

Ink is drawn into the top feed passage 40 from the capillary cells 15, which serves to supply ink to the slot 43 from whence the ink passes, by the passages previously described, to the nib slit 33. The remaining feed passages 40a are primarily valuable in facilitating rapid filling of the pen but may also serve to draw ink from the portions of the cells 15 circumferentially removed from the top feed passage and feed it to the annular capillary space 37 through the slots 43a.

In order to insure filling of the pen to capacity, retention of the ink during use, and smooth feeding during writing, the capillary cells at the portions more remote from the nib preferably are so made as to have a greater capillarity than at the portions nearer to the nib. The capillarity of each cell, theoretically, should be such as to hold a column of ink equal in height to the distance of that cell above the level of the supply of ink (when the pen is being filled) or to the distance of that cell above the writing surface (when the pen is used in writing). For convenience in manufacture, however, the cells are not dimensioned so that they increase in capillarity from cell to cell, but they are made so as to increase in capillarity by groups from the forward end of the pen toward the rear, all of the cells in each group being of the same capillarity, but the cells in each group being of suitably greater capillarity than those in the adjacent group nearer to the forward or nib end of the pen. This is illustrated somewhat diagrammatically in Fig. 4 of the drawings, in which the cells are grouped in five groups, the cells in each group being of the same capillarity (the capillarity theoretically at least as great as that required for the rearmost cell of the group and preferably somewhat greater) but the capillarity of the cells in each group being greater than the cells in the group next nearer the nib end of the pen. For example, referring to Fig. 4, all of the cells in the group indicated at *a* may have the same capillarity; all of the cells in the group indicated at *b* may have the same capillarity but greater than the capillarity of the cells in group *a*. In a similar manner the groups *c*, *d*, and *e* each have cells of greater capillarities than any group nearer the nib end of the pen.

The capillarity of the capillary feed passages must not be so much greater than that of the cells that the edge effect will prevent ink from being drawn into the cells rapidly from the feed passages to fill the cells. In the event the capillarity of the feed passages necessary to lift ink to the rearmost cells during filling is substantially greater than that of the forward cells, preferably one of the feed passages is formed with the necessary capillarity to lift ink to the rearmost cells and at least one of the feed passages is formed with a lower capillarity, not greatly in excess of the capillarity of the forward cells. In such case, the feed passage having the lower capillarity may not be capable of lifting ink to the rearmost cells, but will serve primarily to fill the forward cells. In a similar manner, the capillarities of additional feed passages may be related to cells intermediate the rearmost and the forwardmost cells so that these passages will feed ink to the intermediate cells.

The several portions of the capillary system are defined by relatively fixed, rigid members having definite and pre-determinable, fixed shapes and dimensions; consequently, the capillarities of the several portions of the system can be readily predetermined and will remain substantially fixed during the life of the pen. Also they can be made with substantially no portions having such great capillarity as will retain ink permanently therein; thus, substantially all of the ink in the pen can be written out. This insures the maximum refill or effective ink capacity for a pen having a given initial ink capacity. The relatively smooth walls of the passages aids in preventing clogging.

In one practical embodiment of a fountain pen embodying the invention and having overall exterior dimensions approximately equal to those of a conventional fountain pen, excellent results were obtained by employing a capillary filler element having an overall length of approximately 2¾″ with its forward end disposed approximately ½″ from the writing end of the nib. The cell-forming fins (indicated at 14 in Fig. 1) were approximately 0.010″ thick and of such diameter as to extend to within not less than 0.005″ of the side walls of the reservoir. The end heads 16 and 17 (Fig. 1) were $\frac{3}{32}$″ and $\frac{1}{16}$″ in thickness respectively. The fins 14 were spaced apart to provide cell groups as follows (relative locations of the cell groups being indicated diagrammatically in Fig. 4): in the first group *a* nearest the forward end of the filler element there were 7 cells, each 0.012″ wide; in the next group *b* there were 9 cells each 0.010″ wide; in the next group *c* there were 9 cells each 0.008″ wide; in the next group *d* there were 2 cells 0.006″ wide; and in the rearmost group *e* the cells were 0.005″ wide. The feed passages 40 in the filler element were 0.005″ wide and around 0.012″ to 0.015″ deep. The feed slot 43 and feed passage 37 extending to the nib slit were less than 0.005″ wide, but wider than the nib slit 33 which was from 0.001″ to 0.0015″ in width, and in general were approximately 0.003″ in width. The air passage 46 in the core was approximately $\frac{3}{64}$″ in in width and the air passage 39 at the front end of the pen was approximately the same width.

When the end of the pen was inserted in a supply of Parker "Quink," an acid ink having a surface tension of around 55 dynes per centimeter, the ink reservoir filled to a height above the forward end of the filler element of about 2¾″ in the feed passages, and the cells filled to a height of at least 2¼″.

The present invention is not limited to the dimensions above stated and it will be understood that variations may be made without departing from the invention. Demonstrations have shown that the dimensions of several parts may be varied to some extent so long as the relationships stated are substantially maintained. It will be understood that while the dimensions above have been given in connection with the embodiment of the invention illustrated in Figs. 1 to 11 they may apply equally well to other modifications.

A fountain pen of the capillary type in order to operate satisfactorily must be capable of being filled, written out, and refilled and written out repeatedly. In order to achieve this result, the capillary system of the pen must have such capillary characteristics that it will draw in ink during filling to fill the reservoir to the desired extent, retain the ink in the pen during periods of non-writing, and, when the pen is used in writing, will permit ink to be drawn from the pen by the capillarity established between the nib and the writing surface and the capillary action of the feed between the reservoir and the nib. It has been found that, in order for a pen to have these characteristics, it is necessary that the total ink retentive force of the pen per unit of mean transverse cross-sectional area of the capillary system (or what may be termed the "capillary intensity" of the pen) be within a definite range of values.

The optimum capillary intensity will vary in pens having capillary systems of different characteristics. However, it has been found that for satisfactory operation, capillary systems in pens of normal sizes and shapes must have capillary intensities within the range of from zero to 16 grams per square centimeter. Where the capillary intensity of a capillary system in a pen of normal size and shape exceeds 16 grams per square centimeter, the ink is retained in the pen when it is attempted to use the pen in writing and the pen will not write out satisfactorily. Excellent results have been obtained in practical demonstrations with capillary pens having capillary intensities ranging from 4 to 10 grams per square centimeter. By way of specific example, the pen for which specific dimensions and performance data is given elsewhere herein and described as one specific practical embodiment of my invention has a capillary intensity of approximately 8.25 grams per square centimeter.

Capillary intensity may be expressed mathematically approximately as follows:

$$f = K_1 \frac{[K_2 \sum lT \cos(\theta - \alpha) + \Delta N]}{A_m}$$

where

*f* represents capillary intensity,
$K_1$ and $K_2$ represent constants which depend upon the character of the particular capillary system,
*l* represents the mean perimeter of the individual capillary passages,
*T* represents the surface tension of the ink, $\theta$ represents the wetting angle of the ink relative to the type of capillary surface by which it is confined, $\alpha$ represents the angle of inclination of the walls of the capillary passages to the axis of the pen where such inclination exists, $\Delta N$ represents the total change in capillary force exerted by the nib (and adjacent portion of the capillary system) from the time the pen is filled and suspended vertically with the nib down until the instant after write-out when write-out ceases, and $A_m$ represents the mean transverse cross-sectional area of the capillary system.

The capillarity of the several capillary feed passages and the capillary cells can be increased by providing wall surfaces defining these passages which have a relatively high degree of wettability by the inks with which the pen is to be used. We have found that a surface is satisfactorily wettable for the purposes of the present invention where the contact angle between the surface and the ink with which the pen is used is not substantially greater than 60 degrees.

Satisfactory wettability of the wall surfaces of the capillary cells and feed passages can be obtained by forming the walls of materials which are inherently suitably wettable by the inks. Materials such as hard rubber, "Lucite" (methyl methacrylate resin), "Pyralin" (cellulose nitrate plastic), nylon, polystyrene as well as metals such as silver and gold have been found satisfactory. The wettability of the surfaces can be improved by insuring that all the surfaces of the capillary spaces are free of foreign matter which is not readily wettable, such as oils, greases or waxes. Preferably the filler element after it has been formed is washed thoroughly in water and, where necessary, in a solvent for the foreign matter which may adhere to the surfaces to insure a clean surface. We have found that washing in a solution of sodium hydroxide is effective in many cases to clean the surfaces and to improve the wettability.

In certain cases, the wettability can be increased by including in the material forming the filler element, a suitable wetting agent. For example, in the formation of methyl methacrylate resin, from 2½ to 10% and preferably about 10% by weight of "aerosol O. T." (di-octyl sodium sulfosuccinate) is mixed with the methyl methacrylate while the latter is in monomer form and the latter is then polymerized. The "aerosol O. T." is thus contained in the final product and is effective to provide a surface having a high degree of wettability. Excellent results also have been obtained by adding, in place of "aerosol O. T.," such wetting agents as 7½ to 12% benzoic acid, 5% glycerine, 7% methacrylic acid, or 2½ to 10% di-ethylene glycol.

The wettability of the surfaces of the filler element also may be increased by appropriately treating the surface with suitable chemical reagents after formation of the filler element. Where the filler element is formed from "Lucite" (methyl methacrylate resin) excellent results have been obtained by immersing the formed filler element in 20% fuming sulphuric acid at room temperature for approximately 10 minutes. The filler element is then removed from the acid, and washed in distilled water. In another example, the filler element was immersed in concentrated sulphuric acid at room temperature for approximately 15 seconds and the filler element removed and washed with methanol immediately after removal from the sulphuric acid. In still another example, excellent results were obtained by immersing the filler element in a saturated solution of chromic acid at room temperature for approximately 10 minutes, then removing the filler element and washing it in distilled water and thereafter in methanol.

The entry of ink into the air vent passages from the adjacent capillary cells and feed passages is prevented to a substantial extent by the edge block or edge effect at the junctions of the several air vent passages with the adjacent cells and the feed passages. Entry of ink into the air passages also can be prevented by so constituting the surfaces of the air vent passages that they are relatively non-wettable by the inks with which the pen is used.

Satisfactory results can be obtained by coating the walls of the air passages 45 and 39 and the lower wall of the bore 11 with a material such as methyl silicone chloride which will provide a relatively non-wettable surface. After such treatment the surfaces are of such nature that aqueous inks make liquid contact angles with these surfaces ranging from about 90 degrees and higher, and preferably at least 110 degrees. Thus if any ink tends to be forced out of any of the cells or feed passages at their junctions with the air vent passages the ink will not wet the surfaces of the latter and will not enter the vent passages readily. If any ink does enter the air vent passages it will be readily drawn back into the cells or feed passages owing to the wettability of the cells and the relative non-wettability of the surfaces of the air vent passages.

Several additional embodiments of the invention are illustrated in Figs. 12 to 32 of the drawings and described hereinafter. It will be understood where the construction and operation of the several forms described below are not described in detail they are similar to the construction and operation of the embodiment illustrated in Figs. 1 to 11 and above described.

Figures 12, 13, 15:
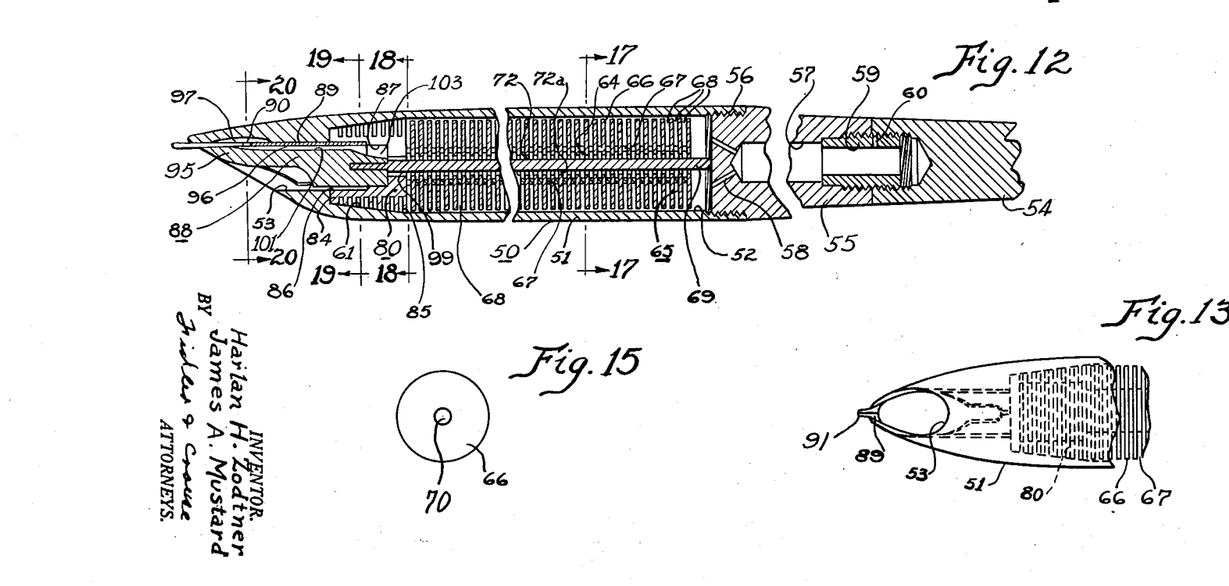
Figure 12 is an enlarged, fragmentary, vertical, longitudinal sectional view through a second embodiment of the invention.
Figure 13 is a fragmentary bottom plan view of the nib end of the pen shown in Figure 12.
Figure 15 is a front elevational view of one of the cell discs of the pen shown in Figure 12.
Figure 14:
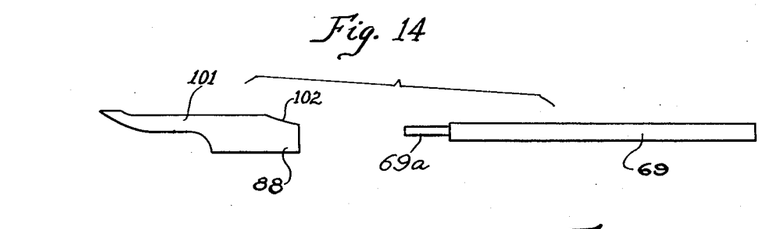
Fig. 14 is a side elevational view of the central rod and feed bar of the pen shown in Figure 12, these members being shown separated for better illustration.
Figures 16, 19:
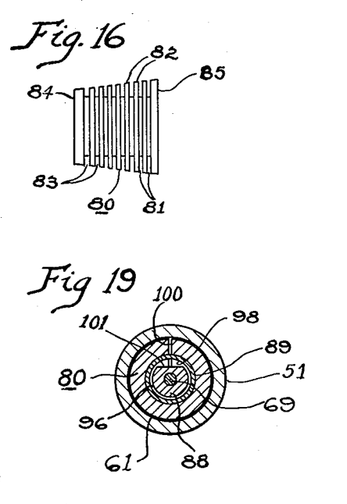
Figure 16 is a side elevational view of the nib holder of the pen shown in Figure 12.
Figure 19 is a transverse sectional view taken along the line 19—19 of Figure 12.
Figure 17:
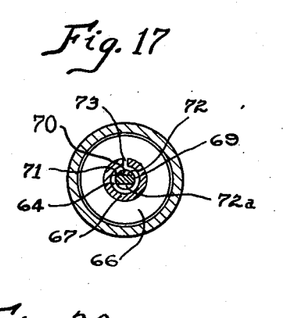
Figure 17 is a transverse sectional view taken along the line 17—17 of Figure 12.
Figure 18:
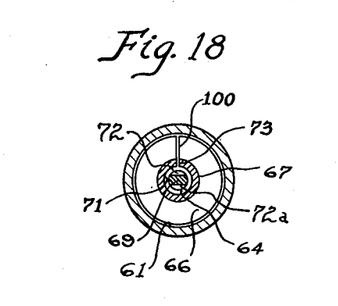
Figure 18 is a transverse sectional view taken along line 18—18 of Figure 12.
Figure 20:
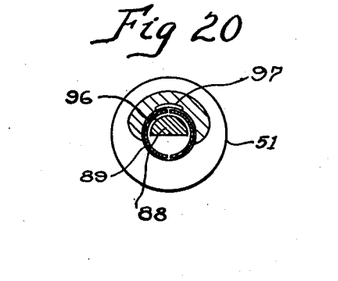
Figure 20 is a transverse sectional view taken along the line 20—20 of Figure 12.
Figure 21:
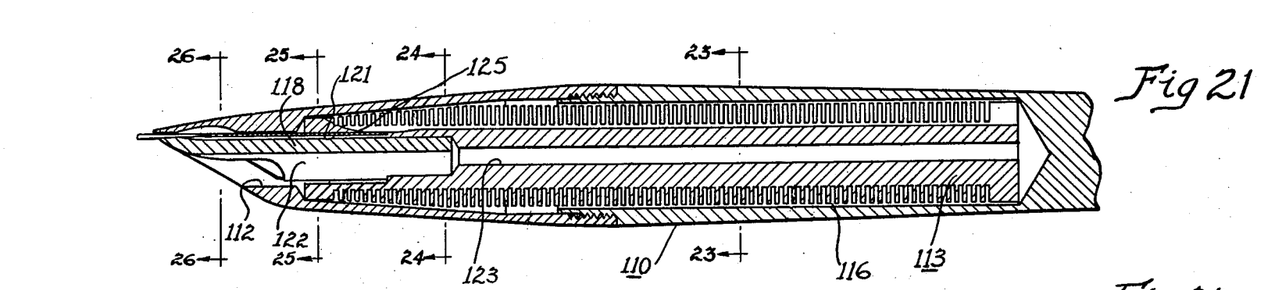
Figure 21 is an enlarged, fragmentary, vertical, longitudinal section taken through another embodiment of the invention.
Figure 22:
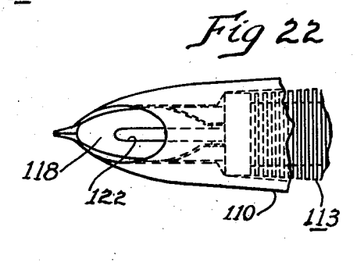
Figure 22 is a fragmentary bottom plan view of the nib end of the pen of Figure 21.
Figure 23:
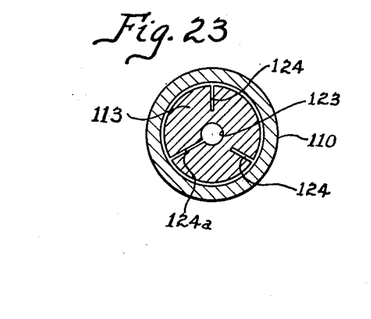
Figure 23 is a transverse sectional view taken along line 23—23 of Figure 21.
Figures 24, 25, 30:
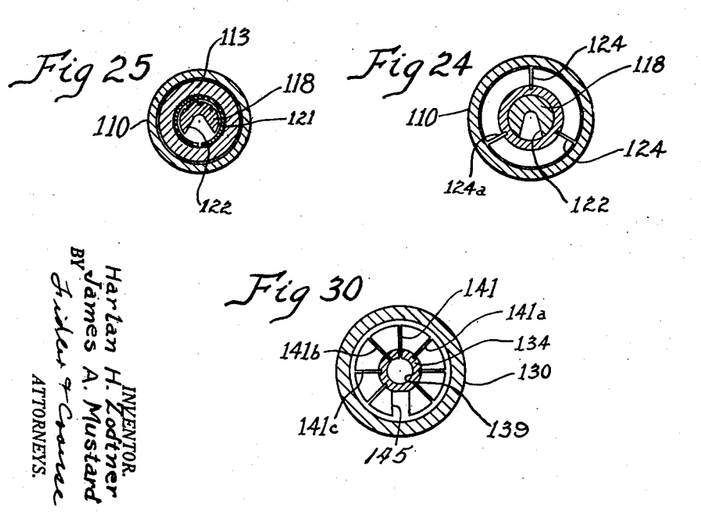
Figure 24 is a transverse sectional view taken along the line 24—24 of Figure 21.
Figure 25 is a transverse sectional view taken along the line 25—25 of Figure 21.
Figure 30 is a transverse sectional view taken along the line 30—30 of Figure 27.
Figure 26:
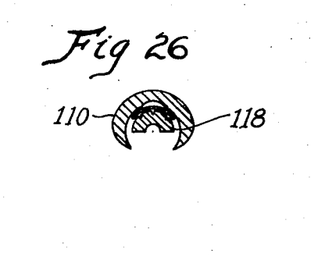
Figure 26 is a transverse sectional view taken along the line 26—26 of Figure 21.

A second embodiment of the invention is illustrated in Figs. 12 to 20. Referring to Fig. 12, the fountain pen shown includes an elongated body 50 comprising a front section 51 having a bore therein providing a chamber or reservoir 52 which extends substantially throughout the length of the front section and has a tapered forward end portion 61. A communicating smaller bore 53 extends from the chamber 52 and accommodates a writing element hereinafter described. The rear end of the front section 51 is closed by a rear section 55 secured to the former as by screw threads 56, and formed with a bore providing a non-capillary passage 57 which communicates through one or more passages 58 with the chamber 52. At the rear end, the bore 57 is closed by an end piece 54 threaded onto a bushing or coupling 59, which itself is threaded into the rear section 55. The bushing 59 is formed with an air vent opening 60 which registers with the joint between the rear section 55 and the end piece 54 to provide an air vent for the chamber 57.

Disposed in the chamber 52 is a capillary filler element 65 which comprises a series of cell discs 66 of annular shape which extend substantially to the wall of the reservoir and are spaced apart by generally annular split rings or spacers 67 of smaller diameter than the cell discs 66 to provide a series of capillary cells 68 of generally annular shape. The cell discs 66 and spacers 67 are positioned in alignment by a central rod 69 which abuts the end of the rear section 55 and extends through central openings 70 and 71 (Fig. 17) in the cell discs 66 and spacers 67 respectively. The central rod 69 fits snugly in the central openings 70 in the cell discs 66 in order to maintain the discs in proper alignment. The spacers 67 need not be maintained in alignment and consequently the central openings 71 therein preferably are of substantially greater diameter than the rod 69, thus providing a generally annular space 64 (Fig. 17) of capillary width defined by adjacent cell discs 66, the interposed spacer 67 and the central rod 69, for a purpose hereinafter explained. The discs 66 and spacers 67 are held in compact relation by a suitable means, as for example by providing a press fit between the rearmost disc or discs 66 and rod 69, or by providing a spacer (not shown) of small diameter at the rear end of the stack to bear against the adjacent end wall of the front section 51.

The rod 69 is flattened through the length of the series of discs 66 and thus two longitudinally extending spaces are provided, between the rod and the adjacent portions of the central openings 70 and 71 which spaces extend throughout the length of the stack of discs 66 and comprise capillary feed passages 72 and 72a. Communication between the feed passages 72 and 72a and each capillary cell 68 is provided a slot 73 formed in the corresponding spacer 67.

The cell discs 66 may be formed of a suitable material which has sufficient rigidity and which is suitably wettable by conventional inks. They may be formed of hard rubber, mica, metal such as silver, or a plastic such as "Pyralin" (cellulose nitrate plastic) or "Lucite" (methyl methacrylate resin). The cell discs may be formed in various ways depending upon the material from which they are constituted. However, owing to their flat discoidal shape they can be formed readily by punching them from a sheet or strip of the appropriate thickness.

Because of the convenient flat shape of the discs prior to assembly to form the filler element, they lend themselves to a method of increasing the wettability of the surfaces, in addition to those described above in connection with the unitary filler element embodied in the pen illustrated in Figs. 1 to 11 of the drawings. Where the cell discs are formed of hard rubber or a plastic, the wettability of the surface can be markedly increased by exposing the surface to a stream of very fine abrasive particles entrained in a fluid and projected against the surface with sufficient force to roughen or pit the surface. A suitable abrasive material is ground to a powder having about 1250 mesh and is thoroughly mixed with clean water. The mixture is forced under pressure through nozzles which atomize the water and project it and the entrained abrasive against the surface of the material to be surface treated under sufficient pressure to roughen the surface completely. Preferably the mixture is projected at pressures of from 50 to 100 lbs. per square inch, with the surfaces held at from 4 to 10 inches from the nozzle. While the increased wettability of surfaces treated in the foregoing manner is not fully understood, it is believed that the roughening of the surface provides very small capillary channels or depressions which act as pilot channels to draw the liquid along the surface and thus cause the liquid to advance along the surface more readily than where the surface is smooth.

The spacers may be formed of a material similar to the material of the cell discs and may be made wettable in a similar manner. However, since the spacers serve primarily as mechanical spacing means for the cell discs it is not essential in most cases that they have such a high degree of wettability as the cell discs.

Since the cell discs may be made very thin, a relatively large number of capillary cells may be provided in any predetermined length of reservoir. Also, since the spacers 67 serve primarily to space the cell discs 66 and do not have to serve as a mechanical support for the latter, the spacers can be made as relatively narrow annular rings, and consequently a relatively large percentage of the total space between adjacent cell discs is available as an ink holding space. Thus, this form of the invention provides a convenient means for forming a capillary filler element in which there is a relatively high ratio of total capillary ink space to the total volume in the reservoir.

Disposed at the forward end of the capillary filler element 65 (Fig. 12) is an end piece or nib holder 80 formed with a central core 81 from which extends a series of spaced circumferential fins 82 which define a series of capillary cells 83 of generally annular shape. The fins 82 extend to and fit snugly in the tapered end portion of the chamber 52 whereby the end piece 80 is firmly seated. The fins 84 and 85 at the ends of the nib holder may be thicker than the intermediate fins 82 for strength. The rear end fin 85 is spaced from the forwardmost cell disc 66 by a spacer disc 67 to provide a capillary cell 68 similar to the other cells 68 formed between adjacent cell discs 66.

The nib holder 80 (Fig. 12) is formed with a bore 86 which frictionally receives and firmly seats a pen nib 89, generally similar to the nib 23 described in connection with the embodiment illustrated in Fig. 1.

A feed bar 88, cooperating with the nib 89, extends through the bore 86 and is frictionally received and firmly seated in a counterbore 87 formed in the nib holder 80. The central rod 69 which supports the cell discs 66 and spacers 67 extends through a second counterbore 99 in the nib holder 80 and firmly seats at its forward end 69a in the feed bar 88. However, if desired, the feed bar 88 and central rod 69 may be formed as a single, integral member.

The feed bar 88 is preferably smaller in diameter than the nib 89 so that a capillary space 96 is provided therebetween. The top of the feed bar 88 preferably is flattened or cut away as at 101 to provide an additional capillary space 98 between the nib 89 and feed bar 88 extending from the rear end of the nib 89 to forwardly of the pierce 90 and supplementing the space 96.

The nib holder 80 is provided with a longitudinally extending, radially arranged capillary feed slot 100 which, together with the counterbore 99 provides a capillary feed passage connecting the capillary feed passages 72 and 72a which extend through the discs 66 and spacers 67 with the capillary feed space 96. The slot 100 also provides a capillary connection between the feed space 96 and the cells 83 in the nib holder 80 and the cell formed between the rear end fin 85 of the nib holder 80 and the forwardmost cell disc 66. To facilitate the flow of ink between the capillary feed slot 100 and counterbore 87 and the feed space 96, the rear end of the feed bar may be cut away as at 102 providing an enlarged space 103 between the feed bar and wall of the counterbore 87.

This pen is filled and writes out in a manner generally similar to the pen of Figs. 1 to 11. In filling, ink enters the capillary space previously described and rises in the pen to fill the cells. The flattened top of the rod 69 and the adjacent edges of the openings 70 in the discs 66 provide walls along which the ink rises in the capillary feed passages 72 and 72a. Ink enters the capillary spaces 64 between the spacers 67, and the rod 69, and is drawn therefrom through the slots 73 in the spacers 67 and into the corresponding capillary cell 68 and fills the cell 68.

Air which is in any empty cell 68, is forced therefrom by the entering ink and escapes through the space between the peripheries of the capillary filler element and the wall of the chamber 52 from whence it flows through the passages 53 and the chamber 57 to the vent opening 60. Some air also may escape through one or the other, or both, of the capillary feed passages 72 and 72a and thence through the vent passages.

While the joint between the rear section 55 and the end piece 54 may be made so as to provide adequate venting when in use, in some cases it may be desirable to provide a higher degree of venting to expedite filling. In the latter case, the end piece 54 is unscrewed slightly, before or at the beginning of the filling of the pen.

Ink is maintained at the ends of the nib by the nib slit 91 which is fed from above by the capillary space 97 and from below by the capillary space 96. The space 97 is fed through the nib pierce from the space 96 and the latter receives ink from the space 103. Owing to the shape of the cut 102 in the feed bar 88, at least a portion of the space 103 between the upper rear end of the feed bar and the walls of the bore 86 is slightly larger than the adjacent capillary spaces and serves as a small reservoir to insure that ink will be available to feed freely to the nib through the capillary passages leading thereto. Ink is drawn into the space 103 from the capillary cells 83 by the feed slot 100 in the nib holder 80. Ink also is drawn into the space 103 from the capillary cells 68, by way of the feed passages 72 and 72a and the counterbore 99 through the end wall of the nib holder 80, and also through the slot 100.

A third embodiment of the invention is illustrated in Figs. 21 to 26 in which the pen includes a body 110 having an ink reservoir space 111 and a nib and feed bar opening 112 at its front end. A capillary filler element 113 generally similar to that of Figs. 1 to 11 is disposed in and extends throughout the reservoir space.

However, feed bar 118 is formed with a large downwardly opening groove 122 extending throughout its length and communicating with a central air passage 123 extending throughout the length of the capillary filler element 113. The groove 122 and passage 123, together form an air vent passage extending from the rear end of the reservoir to the opening 112.

Extending longitudinally of the filler element 113 is one or more, and preferably a plurality, of feed passages 124 and 124a formed by slotting the filler element 113 and communicating with a space 121 under the nib through slots 125 in the core. At least one of the feed passages 124a preferably is cut through to the central air passage 123, thereby placing each of the cells in communication therewith.

During filling, air which is in the cells 116 is forced out through the feed passage 124a and into the air passage 123 and is vented through the outlet provided by the groove 122 in the feed bar 118 and the opening 112 in the pen body 110. In order to facilitate venting of the air from the cells, the feed passage 124a preferably is formed with a lesser capillarity than the other feed passages 124 so that ink will rise more slowly in the passage 124a than in the other feed passages 124. Air which is forced out of each cell thus can pass through the feed passage 124a and into the air passage 123.

In writing, ink is delivered to the nib slit in a manner generally similar to that described in connection with the pen illustrated in Fig. 1.

A further embodiment of the invention is illustrated in Figs. 27 to 32 in which the walls of the pen body 130 are made as thin as practicable having in mind the necessary mechanical strength, and the fins 135 of the filler element 133 are tapered to correspond generally with the diameter of the reservoir, thus providing cells having the maximum diameters for the external size of the pen body. A feed bar 137 is formed integrally with the filler element 133 and frictionally mounts a nib 138 which snugly fits in an opening 132 in the casing 130 and projects therefrom at its forward end. The core 134 of the filler element 133 is formed with an air passage 139 extending throughout its length and the feed bar 137 is formed with an air passage 140 extending throughout its length and providing communication between the air passage 139 and the exterior of the pen.

Extending along and intersecting the cells 136 is one or more, and preferably a plurality, of feed passages 141, 141a, 141b, and 141c formed by slotting the filler element 133 in a manner generally similar to that above described. One feed passage 141 extends along the top of the filler element 133 in alignment with the pen nib slit 142 and pierce 143 and is extended through the forward end fin 144 and throughout the length of the feed bar. This feed passage 141 thus provides a continuous capillary ink passage from all of the cells directly to the pen nib slit 142. At least one of the feed passages 141a, other than the top feed passage 141 is extended through the forward end fin 144 and partially along the feed bar 137 so that such passage can be brought into direct communication with a supply of ink in filling.

One or more and preferably several of the feed passages, for example, feed passage 141b, may be extended through to the air passage 139 to provide means for venting the cells during filling. Additional venting may be provided, where desired, by forming a non-capillary slot 145 in the capillary filler element preferably in the bottom portion thereof; this slot is in communication with the exterior of the pen through the space between the feed bar 137, the front opening 132 and the edges of the nib slit 142.

Air which is in the cells is forced into the air passage 139 through the feed passages 141 and 141b and any others which may be in communication with the air passage and is vented through the front end of the feed bar. In addition, where an exterior air passage, such as the passage 145, is provided, air is forced into this passage and vented through the space between the feed bar 137 and front opening.

In writing, ink is fed directly to the nib slit 142 by the feed slot 141. The other feed passages 141a, 141b and 141c may serve to maintain the forward capillary cells filled by drawing ink from the rearward cells 136.

We believe that the operation and advantages of the invention will be well appreciated from the foregoing description, and it is to be understood that, while we have shown and described several forms of the invention, other details and arrangements of parts may be resorted to without departing from the spirit and scope of the invention as defined by the claims that follow.

The term "reservoir" as used herein will be understood to mean the principal ink storage means of the pen, having an ink storage capacity comparable to the capacity of a conventional fountain pen, and very much larger than the capacity of the feed means, and adapted to supply ink to the writing point by way of the feed to replace ink withdrawn at the point in writing.

The term "feed means" as used herein will be understood to refer to means at the forward or writing end of the pen, closely adjacent the writing point and connecting the reservoir therewith for the purpose of delivering and controlling the flow of ink from the reservoir to the writing point, such means being adapted to be maintained filled or saturated with a relatively small quantity of ink at all times that any ink remains in the reservoir.

We claim:

1. A fountain pen comprising a body having a feed section and a reservoir section rearwardly of said feed section and providing a reservoir space, a pen nib supported on said body, means for filling said pen by capillary action including a capillary filler and reservoir element in said reservoir space and having spaced opposed planar walls defining a plurality of interconnected capillary cells providing an ink storage space, the surfaces of said walls having minute depressions therein to provide a surface with which aqueous inks make effective liquid contact angles ranging from around around zero degrees to around 60 degrees, and ink feed means in said feed section connecting said ink storage space and said nib, said ink storage space having a substantially greater ink storage capacity than said feed means.

2. A fountain pen comprising a body having a feed section and a reservoir space rearwardly of said feed section, a pen nib supported on said body, means for filling said pen by capillary action including a capillary filler and reservoir element disposed in said reservoir space and having generally opposed walls defining a capillary ink storage space, said walls having surfaces with which aqueous inks make liquid contact angles not substantially greater than 60 degrees, feed means in said feed section connecting said capillary space and said nib, and means for continuously venting said capillary space to atmosphere including an air vent passage defined by walls having surfaces with which aqueous inks make liquid contact angles not substantially less than 110 degrees, said ink storage space having a substantially greater ink storage capacity than said feed means.

3. A fountain pen comprising a body having a feed section and reservoir space rearwardly of said feed section, a pen nib supported on said body and having a slit providing a capillary ink passage, means for filling said pen by capillary action including a capillary filler and reservoir element disposed in said reservoir space and having spaced, generally opposed walls defining a capillary ink storage space, feed means in said feed section having a capillary ink passage connecting said capillary space and said nib, said ink storage space having a substantially greater ink capacity than said feed means, and means for continuously venting said reservoir to atmosphere, said ink storage space and the capillary passages in said nib and feed means together having a capillary intensity of approximately 8 grams per square centimeter.

4. A fountain pen comprising a body, a feed section and a reservoir section rearwardly of said feed section, a writing element supported by said body, means for filling said pen by capillary action including a capillary filler and reservoir element supported by said body and defining a capillary ink storage space, and feed means in said feed section defining a capillary ink feed passage connecting said ink storage space in ink feeding relation to said writing element, said filler element being formed of a material having incorporated one or more materials selected from the group consisting of di-octyl sodium succinate, benzoic acid, glycerin, methacrylic acid and diethylene glycol, and said ink storage space having a substantially greater ink storage capacity than said feed means.

5. A fountain pen comprising a body having a feed section and an ink reservoir space extending rearwardly of said feed section, a nib supported in said feed section, feed means in said feed section and connected to said nib, means for filling said pen by capillary action including a capillary filler and reservoir element extending substantially throughout the length of said reservoir space and having a capillary ink storage space therein connected to said feed means for maintaining ink in said feed means so long as there is ink in said storage space, and an air vent passage extending substantially throughout the length of said filler and reservoir element and in communication substantially throughout its length with said capillary space and constantly communicating freely with said reservoir space rearwardly of said ink storage space and with the exterior of said pen for venting said storage space continuously to atmosphere and maintaining all ink-air interfaces in said pen at atmospheric pressure, said ink storage space having a substantially greater capacity than said feed means.

6. A fountain pen comprising a body having a feed section and a reservoir section rearwardly of said feed section defining a reservoir chamber, a pen nib supported in said feed section and having a capillary ink slit, means for filling said pen by capillary action including a capillary filler and reservoir element in said reservoir chamber and having spaced, generally parallel wall elements extending transversely of said chamber and defining therein a plurality of interconnected capillary cells together providing an ink storage space, and means defining a feed channel extending substantially throughout the length of said filler and reservoir element to rearwardly of the rearmost of said cells and intersecting said cells, said feed channel having sufficient capillarity to lift ink by capillary action when placed in feeding relation with a supply of ink and said cells having sufficient capillarity respectively to draw in ink from said feed channel by capillary action, vent means constantly communicating with each of said cells and with said reservoir chamber rearwardly of said cells for constantly maintaining all ink-air interfaces in said pen at atmospheric pressure, and feed means in said feed section including a feed bar having a capillary feed passage connecting said feed channel and said nib slit, said ink storage space having a substantially greater ink storage capacity than said feed means.

7. A fountain pen comprising a casing having a feed section and a reservoir section extending rearwardly from said feed section and defining a reservoir chamber, a pen nib at the forward end of said casing and having a capillary ink passage therein, a capillary filler and reservoir element in said reservoir chamber including a plurality of relatively rigid, fixed elements disposed to provide a plurality of intercommunicating small chambers the walls of each being in opposed relation and spaced from each other a distance not exceeding that which will cause ink to be drawn therein by capillary action when said nib passage is placed in filling relation with a supply of ink, to define therebetween a capillary ink storage space, and capillary ink feed means in said feed section and connecting said ink storage spaces and said nib passage and having a capillarity sufficient to maintain ink therein in all positions of the pen, said ink storage space having a substantially greater ink capacity than said feed means, and means defining a vent passage communicating with said small chambers and with said reservoir chamber rearwardly of said small chambers for continuously venting said small chambers to atmosphere and constantly maintaining the entire ink-air interface in said pen at atmospheric pressure.

8. A fountain pen comprising a casing having a feed section and a reservoir section extending rearwardly from said feed section and defining a reservoir chamber, a pen nib at the forward end of said casing and having a capillary ink passage therein, capillary ink feed means in said feed section and connected in ink feeding relation with said nib passage, a capillary filler and reservoir element in said reservoir chamber including a plurality of relatively fixed, rigid elements disposed to provide a plurality of interconnected ink storage spaces, each having opposed wall portions having surfaces formed of material with which aqueous inks form liquid contact angles between zero degrees and approximately 60 degrees and spaced apart a distance not exceeding that at which ink will be drawn into said space by capillary action to fill such space and will be retained therein by capillary action but less than that at which ink will be retained against withdrawal in writing and a feed and filling passage connecting said spaces and said feed and having a capillarity sufficient to raise ink by capillary action to the levels of said spaces but insufficient to prevent ink from being drawn by capillary action therefrom into said spaces, said spaces together constituting the principal ink storage means of the pen and having a substantially greater ink capacity than said feed, and vent means communicating with said reservoir chamber rearwardly of said spaces for venting said ink storage spaces to atmosphere and constantly maintaining the entire ink-air interface of the ink in the pen at atmospheric pressure.

9. A fountain pen comprising a casing having a feed section and a reservoir section defining a reservoir chamber rearwardly of said feed section, a pen nib at the forward end of said casing, capillary feed means in said feed section having a feed passage in ink feeding relation with said nib, a capillary filler and reservoir element in said reservoir chamber and including a plurality of partition elements providing substantially planar walls arranged in spaced, opposed relation and defining therebetween a capillary ink storage space connected to and of substantially greater ink capacity than said feed means and constituting the principal ink storage means of the pen, said walls being spaced apart a distance which will produce a capillary action sufficient to draw ink through said feed passage and into said space to fill said space by capillary action and to retain the ink therein by capillary action but insufficient to retain the ink against withdrawal of ink in writing, and means for constantly venting all portions of said storage space to atmosphere to maintain all ink-air interfaces of the ink in said pen at atmospheric pressure.

10. A fountain pen comprising a casing having a feed section and a reservoir section defining an elongate reservoir chamber rearwardly of said feed section, a writing element at the forward end of said casing, a capillary filler and reservoir element in said chamber including a member extending along said chamber formed with an ink feed channel extending therealong of sufficient capillarity to raise ink therein by capillary action and having relatively fixed walls arranged to provide opposed wall surfaces extending in a generally transverse direction relatively to said chamber and spaced apart substantially uniformly to define therebetween a plurality of capillary space portions intersected by said feed channel and constituting the principal ink storage space of said pen, said opposed wall surfaces being spaced apart a distance whereby each of said capillary space portions has sufficient capillarity to draw ink therein from said ink feed channel to fill itself by capillary action and to retain the ink therein by capillary action but insufficient to retain ink against withdrawal in writing, means for constantly venting all portions of said storage space to atmosphere to maintain all surfaces of the ink in said pen at atmospheric pressure, and capillary ink feed means in said feed section connecting said ink storage space and said writing element.

11. A fountain pen comprising a body having a feed section and a reservoir section rearwardly of said feed section, feed means disposed in said feed section, a pen nib in said feed section and associated with said feed means, means for filling said pen by capillary action including a capillary filler and reservoir element disposed in said reservoir section and having a plurality of interconnected capillary cells therein each having a wall-to-wall dimension not exceeding that which will cause ink to be drawn therein by capillary action when the nib is inserted in a supply of ink and defining an ink storage space of substantially greater capacity than said feed, said feed means having a predetermined ink feed channel, as distinguished from said cells, connecting said cells with said pen nib and of a capillarity not less than said cells and sufficient to retain a continuous column of ink therein from said cells to said nib in all positions of the pen, and means for continuously venting said reservoir section to the atmosphere.

12. A fountain pen comprising a body having a feed section and a reservoir section rearwardly of said feed section, feed means disposed in said feed section, a pen nib associated with said feed means, means for filling said pen by capillary action including a capillary filler and reservoir element disposed in said reservoir section and having relatively rigid opposed wall elements disposed in predetermined, fixed relation defining a substantially continuous capillary ink storage space extending substantially throughout said reservoir section, said wall elements being spaced apart a distance not exceeding that which will cause ink to be drawn into said space by capillary action when said nib is inserted in a supply of ink, and a filling channel connected to said cells and communicating with the exterior of said pen body independently of said feed means and having a capillarity not less than said cells, said feed means having a predetermined capillary ink feed channel, as distinguished from said ink storage space, connecting said space and said nib and of a capillarity not less than said space for maintaining a continuous column of ink from said space to said nib, and means for continuously venting said cells to atmosphere.

13. A fountain pen comprising a body having a feed section and a reservoir section formed with an ink reservoir space rearwardly of said feed section, a pen nib supported on said body, feed means in said feed section defining a capillary feed passage connected to said nib, and means in said reservoir space for filling said pen by capillary action and having a plurality of interconnected capillary cells connected to said feed passage, and a predetermined capillary filler passage as distinguished from said cells connected to each of said cells and extending from said cells and communicating with the exterior of said body independently of said feed means for placing said cells in capillary filling relation with a supply of ink.

14. A fountain pen comprising a body having a feed section and a reservoir section rearwardly of said feed section and providing an ink reservoir space, a pen nib supported on said body, feed means connected to said pen nib, and means for filling said pen including a capillary filler and reservoir element in and substantially filling said reservoir space and having a plurality of capillary cells therein and a predetermined capillary feed channel as distinguished from said cells interconnecting said cells and connecting said cells to said feed means, said cells, feed channel and feed means having sufficient capillarity to draw ink into said cells through said feed means to fill all of said cells and to retain, solely by capillary action, a continuous column of ink therein from said cells to said nib in any position of said pen.

15. A fountain pen comprising a body having a feed section and a reservoir section rearwardly of said feed section and providing an ink reservoir space, a pen nib supported on said body and having a capillary slit, feed means including a predetermined feed passage connected to said nib slit, and means for filling said pen by capillary action including a capillary filler and reservoir element in said reservoir space having a plurality of capillary cells therein and a predetermined capillary feed channel interconnecting said cells and connecting said cells to said feed passage, said feed channel having a capillarity substantially equal to that of said cells and less than said feed passage and said feed passage having a capillarity greater than said feed channel but less than said nib slit, whereby ink is drawn from said cells through said feed channel and feed passage to said nib slit to maintain a continuous column of ink in said channel and passage.

16. A fountain pen comprising a body having a feed section and a reservoir section extending rearwardly of said reservoir section and providing a reservoir space, a pen nib supported on said body, means for filling said pen by capillary action including a capillary filler and reservoir element disposed in said reservoir space and having spaced, generally opposed walls spaced apart a distance not substantially in excess of 0.005'' and defining a plurality of interconnected capillary cells providing an ink storage space, the surfaces of said walls being formed of a material with which aqueous inks form liquid contact angles ranging from zero degrees to approximately 60 degrees, means constantly venting said reservoir space rearwardly of said cells to atmosphere to maintain all portions of the ink-air interface at atmospheric pressure, and feed means in said feed section providing a capillary feed passage connecting said cells and said nib of a capillarity not less than said cells to maintain a continuous column of ink from said cells to said nib, said ink storage space being of substantially greater ink capacity than said feed means.

17. A capillary fountain pen comprising a casing having a feed section and a reservoir section rearwardly of said feed section, a writing element, capillary filler and reservoir means mounted in said casing and having opposed walls defining an ink storage space therein, said casing having an opening by which said storage space is vented to atmosphere, said opposed walls being spaced apart approximately 0.005'' to provide sufficient capillarity to draw ink into said storage space by capillary action when placed in communication with a supply of ink and to retain ink therein when the pen is not in use but insufficient to retain ink against the capillarity established between the writing element and the writing surface when the pen is used in writing, and ink feed means including a predetermined capillary passage connecting said storage space and said writing element in ink feeding communication, said filler and reservoir means and said feed means having a capillarity not less than said storage space thereby to retain, solely by capillary action, a continuous column of ink from said storage space to said nib in all positions of said pen but less than the capillarity established between the writing element and the writing surface, said storage space having a substantially greater ink capacity than said feed means.

References Cited in the file of this patent

UNITED STATES PATENTS

| Number | Name | Date |
|---|---|---|
| 1,001,225 | Sinnot | Aug. 22, 1911 |
| 1,611,234 | Richardson | Dec. 21, 1926 |
| 1,613,812 | Wahl | Jan. 11, 1927 |
| 2,114,118 | Studer et al. | Apr. 12, 1938 |
| 2,187,528 | Wing | Jan. 16, 1940 |
| 2,215,630 | Wright et al. | Sept. 24, 1940 |
| 2,223,541 | Baker | Dec. 3, 1940 |
| 2,311,488 | Stow | Feb. 16, 1943 |
| 2,397,229 | Biro | Mar. 26, 1946 |
| 2,421,079 | Narcus | May 27, 1947 |
| 2,521,657 | Severy | Sept. 5, 1950 |

UNITED STATES PATENTS

| Number | Name | Date |
|---|---|---|
| 81,466 | Austria | of 1920 |
| 213,442 | Switzerland | May 1, 1941 |